Oct. 3, 1961 P. KOBLER 3,002,276
KNIVES IN MECHANICAL SHAVERS
Filed Dec. 4, 1957
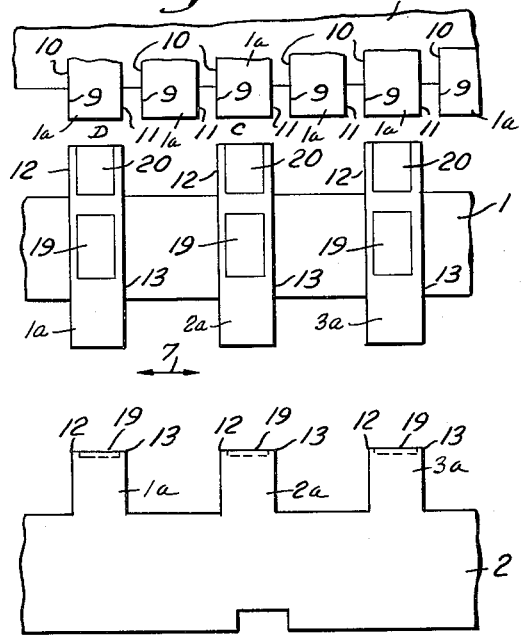
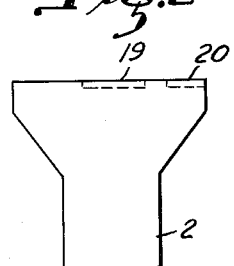
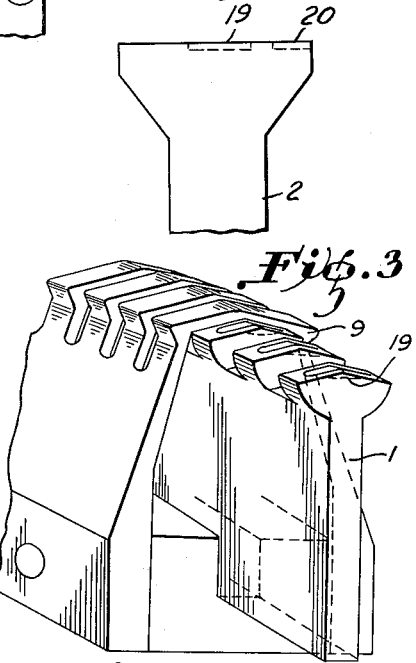
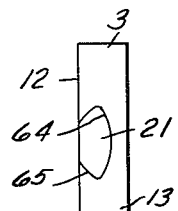
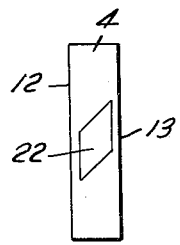
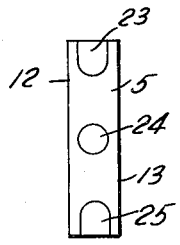
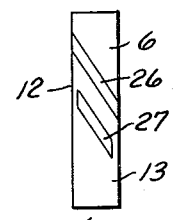
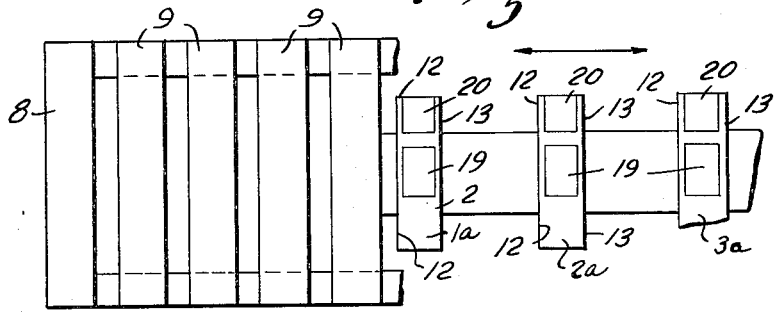
INVENTOR
Paul Kobler United States Patent Office 3,002,276
Patented Oct. 3, 1961

3,002,276
KNIVES IN MECHANICAL SHAVERS
Paul Kobler, 81 Fenimore St., Lynbrook, N.Y.
Filed Dec. 4, 1957, Ser. No. 700,649
1 Claim. (Cl. 30—43)

Among the objects of the invention are means to cut down the shaving time to a minimum.

Another object of the invention is to provide the inner cutter with cutting edges for long hair and cutting edges for very short stubbles.

Another object of the invention is to provide cutting edges on the inner knife which stand at an angle to each other, thus giving different cutting actions.

Another object of the invention is to have the cutting edges of the outer cutter and the cutting edges of the inner knife at different intervals relative to each other and the number of the cutting edges of the inner knife increased. Another object of the invention is to provide the knives of the inner cutter with additional cutting edges, the additional cutting edges at the same angle on all cutting knives of the inner cutter.

Another object of the invention is to provide the knives of the inner cutter with additional cutting edges, the additional cutting edges at various angles on the cutting knives of the inner cutter.

In the accompanying drawings are shown various possible embodiments of the several features of the invention.

FIG. 1 is a top view showing three knives on a part of an inner cutter shown in the right relationship to the cutting distance of the cutting bars of an outer cutter, which for comparison of the distance of the cutting edges on the inner knives, is places in a broken off part of the outer cutter, parallel to the broken off part of the inner cutter. This view is only designed for comparison. In reality the inner cutter moves inside the outer cutter.

FIG. 1a, is a side view of the inner cutter shown in FIG. 1.

FIG. 1b, is a side view of an indentation in the top surface of an inner cutter.

FIG. 1c, 1f, 1h, and 1i, are top views of single teeth of different embodiments of indentations on the top cutting surface of an inner cutter.

FIG. 1d, is a top view of FIG. 1, whereby it is shown, how the inner cutter fits into the outer shearhead member.

FIG. 2 is an enlarged side view of a single tooth of an inner cutter.

FIG. 3 shows another modificaion of an inner knife going into an outer, lengthwise curved shearhead member.

Referring now to the drawings, there is shown in FIG. 1 the top view of an inner cutter 1. Only a broken part off the inner cutter is shown with three knives, number 1a, 2a, and 3a. The inner cutter moves back and forth inside the outer cutter, as indicated by arrow 7. The outer cutter 8, is for comparison only, drawn in a broken off part parallel to the inner cutter 1. The cutting bars of the outer cutter are also broken off and seen as number 9. Each cutting bar 9 of the outer cutter 8 has two cutting edges 10 and 11 the numbers being shown on some of the cutting bars.

Each knife of the inner cutter 1 in FIG. 1, and of the inner cutter 2 in FIG. 1a, has a plurality of teeth, as shown by numbers 1a, 2a, and 3a. Each tooth has two cutting edges, 12 and 13.

FIG. 1 shows that the distance between the knives of the inner cutter 1 is bigger than the distance of the cutting bars 9 of the outer cutter 8. And so is the distance between the cutting edges of the cutting bars from one bar to another different from the cutting edge distance of the inner knives from one knife to another. Therefore cutting edge 12 on the inner knife 3 with one side motion cuts the hair first on cutting edge 11 of the cutting bars 9 of the outer cutter and then moving further cuts the hair also on cutting edge 11 of another cutting bar of the outer cutter 8. That is, the hair between two cutting bars 9 of the outer cutter are cut off, with one side motion of the inner cutter 1 and one knife of said inner cutter.

The supports of the cutting edges may also be in another than 90 degree angle (slanting) to the direction of movement of the inner cutter.

To achieve a perfect cutting action, the inner cutter must be pressed against the outer cutter. My invention is in the fact that the knife part which touches the outer cuter bars when in motion, or at least a single bar if not in motion, is ground again, to create additional cutting edges on each inner knife. The inner cutter bars in FIGURE 1 carry a plurality of knives. These knives have surfaces. The hair cutting takes place on two edges of each surface. The surfaces are rather narrow. However they are not so narrow, that it is not possible to grind, stamp or cast a depression into these surfaces. Thereby additional cutting edges are created. Such depressions are shown in FIG. 1 by the numbers 19 and 20. The depressions vary in depth and shape. They may be uniform on all knives, or may be only on a part of the knives. Or the knives of one inner cutting bar may have two depressions, as shown in FIG. 1. Many combinations are possible for the knives of inner cutters, as the different angles of the additional cutting edges create different cutting results. The drawings show only knives with a reciprocal motion. Of course the invention applies also to knives which are arranged for rotary action. The principle of the invention, to create additional cutting edges remains the same, as long as with rotary action an outer cutter and an inner cutter is present and the hair cutting takes place through cutting edges.

The invention remains in the fact, that more cutting edges cut hair with each motion of the inner cutting body, not by enlarging the extent of the motion, but by adding new cutting edges to each knife.

The additional cutting edges may go all across the cutting bar.

A depression of a few thousand of an inch or even less, may already create new cutting edges. Or a space may be created in the knife all the way down to its base to create new cutting edges.

In operation the invention works as follows: A shaving head consists of an inner and outer cutter. The inner cutter carries knives at regular intervals. In other words there is a space between each knife of the inner cutter. This open space is preferably wider than the space between the bars of the outer cutter. Preferably the open space between the knives of the inner cutter is so wide that the single knife moves first across an open space between the bars of the outer cutter, then across the space taken up by said bar and still across another opening between the bars of the outer cutter. The extent of the motion of the inner cutter is shown in FIG. 1 where knife 3 moves from "c" to "d." When moving a shaver shearhead over the face hair will enter between the bars 9 of the outer cutter. The inner cutter with knife 2a moving towards "d" moves cutting edge 12 towards and over the next bar 9 of the outer cutter. Thereby cutting edge 12 of knife 2a cuts the hair on cutting edge 11 of the stationary bar 9. Further moving towards "d" and a little over it, cutting edge 12 of knife 2a will again cut the hair between the next space of cutting bars 9, by cutting them with cutting edge 12 of knife 2a at cutting edge 11 of the next stationary cutting bar. In other words, in this particular case, cutting edges 12 cuts the hairs off on the cutting edges 11 of two stationary cutting bars.

However, if the knife of the inner cutter is provided with additional cutting edges, a much greater amount of cutting hair takes place. And this happens without having the knives moving differently than before. In the case of FIG. 1 a depression 21 has created two additional cutting edges 64 and 65. The depression creates first in the middle a double edge, that is an edge sharp on both sides, outside it is cutting edge 12, inside it cuts as cutting edge 65. The opposite side of the depression leaves in the middle line a small surface between the in and outside cutting edges of the inner knife 3.

We have now the surprising effect, that the single knife 3 has a double cutting effect. The first motion of knife 3 from "c" to "d" cuts now the long hair between the space of the outer stationary cutter bar, then moves further towards "d" whereby the inner cutting edge 64 cuts the short stubbles or longer stubbles, if they have entered the space between bars 9 while moving the shaver. In other words two cutting actions have taken place on cutting edge 11, instead of one as before. The same happens at the next stationary cutting bar. Therefore we have with one motion of the inner knife a double action, four cutting actions instead of two. The same will take place with cutting edges on a stationary sieve head, where the holes in the sieve constitute the cutting edges of the stationary outer cutter. In cases where the inner cutter is reciprocating, another double action is achieved with the backward motion. In a rotary motion the double cutting action takes place in a continuous forward motion of the inner cutter.

It is now obvious that according to the shape of the cuttings edges, the hair is cut at different angles. This is a very important feature. So we see that knife 3 in FIG. 1 cuts the hair first with a straight edge 12 moving in parallel planes towards cutting edge 11 of cutting bar 9 of the stationary cutter. Cutting edge 64 being curved will cut hair at angles and in the middle of the depression the angles of the cutting edge 64 go apart and will not let escape any stubbles.

On all the knives shown in the figures we see an increased number of cutting edges.

All the different embodiments have one common purpose, namely to increase the cutting edges to at least two, following in the direction of the movement on each inner knife. Also to make a variety of cutting angles possible on one inner knife. Also to vary the depth of the cutting edges suitable for long and short hair and increase first of all the efficiency of the shaver.

As many changes could be made in the above construction, and many apparently widely different embodiments of this invention could be made without departing from the scope thereof, it is intended that all matters contained in the above description or shown in the accompanying drawings shall be interpreted as illustrative and not in a limiting sense.

Another modification is, that the cutting edges may be very short. Also the distance between the outer cutting edges and the inner cutting edges, relative to each other, may be as wide as possible or in any degree less in width, down to a very minute measurement.

Also the space between the cutting edges may be of many different shapes, these shapes having a result on the cutting effect of the cutting edges. The space between the cutting edges may be on a level plane or depressed. The depression may go all along across the knife, from one end to the other, or only part way, in one of several depressed sections. The shaving head itself with outer stationary and inner movable cutter may have any shape, may also be lengthwise curved.

The definition of an inner knife is as follows: A movable support of a plurality of cutting knives inside a stationary outer cutter member, the movable support going over into the upper part of the inner knife where the cutting edges are. These cutting edges being pressed towards the inner wall of the outer stationary cutter to effect the cutting of the hairs. The area where the cutting edges, and additional cutting edges, touch the inner wall of the outer stationary member, is the area where this invention is located.

It does not matter how the knives are shaped, as long as they have a top surface with indentations and the distance between the cutting edges differs, they are covered by this invention. Cutting edges may be increased by adding more cutting knives, however when increased by indentations on the cutting surfaces of such knives, it refers to this invention. The cutting surface of a knife is by necessity of small width. However the space between two knives should be as wide as possible, to give more time to the stubble to enter between such knives.

Having thus described my invention, what I claim as new and desire to secure by Letters Patent is:

A cutting head for a dry shaver, said head comprising an outer shear member and an inner movable cutter cooperable with the outer shear member, said inner movable cutter having a plurality of and transversely spaced cutting teeth, each tooth having indentations on their top surfaces to provide additional cutting surfaces, the distance between the cutting edges on one tooth being considerably smaller than the distance between the cutting edge of said tooth and the cutting edge of the adjacent tooth, said cutting edges formed in a tooth by the indentations being transversely spaced, as well as the cutting surfaces on each side of said tooth, the inner cutter being adapted to be moved within the outer shear member to cut the hair extending through openings in the shear member.

References Cited in the file of this patent

UNITED STATES PATENTS

| | | |
|---|---|---|
| 2,078,563 | Connolly | Apr. 27, 1937 |
| 2,141,582 | Wimberger | Dec. 27, 1938 |
| 2,198,832 | Muros | Apr. 30, 1940 |
| 2,266,885 | Martin | Dec. 23, 1941 |
| 2,273,685 | Berg | Feb. 17, 1942 |
| 2,286,443 | Scully | June 16, 1942 |
| 2,287,020 | Brull | June 23, 1942 |
| 2,292,858 | Alexayy | Aug. 11, 1942 |
| 2,297,915 | Rand et al. | Oct. 6, 1942 |
| 2,298,872 | Dalkowitz | Oct. 13, 1942 |
| 2,300,140 | Te Pas et al. | Oct. 27, 1942 |
| 2,400,027 | Scully | May 7, 1946 |
| 2,573,758 | Bailey | Nov. 6, 1951 |
| 2,701,414 | Knapp | Feb. 8, 1955 |

FOREIGN PATENTS

| | | |
|---|---|---|
| 469,782 | Great Britain | Aug. 3, 1937 |
| 526,172 | Great Britain | Sept. 12, 1940 |